(12) United States Patent
Wang

(10) Patent No.: US 9,197,272 B2
(45) Date of Patent: Nov. 24, 2015

(54) CELLPHONE WITH A DETACHABLE RECEIVER

(71) Applicant: COREMATE TECHNICAL CO., LTD., Taoyuan County (TW)

(72) Inventor: Robert Wang, Taoyuan County (TW)

(73) Assignee: COREMATE TECHNICAL CO., LTD., Guishan Township, Taoyuan County (TW)

( * ) Notice: Subject to any disclaimer, the term of this patent is extended or adjusted under 35 U.S.C. 154(b) by 128 days.

(21) Appl. No.: 14/244,076

(22) Filed: Apr. 3, 2014

(65) Prior Publication Data

US 2015/0288404 A1    Oct. 8, 2015

(51) Int. Cl.
*H04M 1/60* (2006.01)
*H04B 1/3877* (2015.01)

(52) U.S. Cl.
CPC ........... *H04B 1/3877* (2013.01); *H04M 1/6066* (2013.01)

(58) Field of Classification Search
CPC ............. H04B 1/3877; H04M 1/6041; H04M 1/6058; H04M 1/6066
USPC ................ 455/569.1, 575.1; 379/428.01, 431
See application file for complete search history.

(56) References Cited

U.S. PATENT DOCUMENTS

2002/0176588 A1* 11/2002 Seto .......................... H04R 3/02
                                                              381/92

* cited by examiner

*Primary Examiner* — Raymond Dean
(74) *Attorney, Agent, or Firm* — Bacon & Thomas, PLLC

(57) ABSTRACT

A cellphone with a detachable receiver includes a cellphone body having a topside provided with a recessed groove and an outer side transversely bored with a through hole. A receiver is inserted in the recessed groove of the cellphone body and exactly positioned at the location of the through hole of the cellphone body and installed therein with a rechargeable battery and a bluetooth device. Thus, when the receiver is inserted in the recessed groove, the through hole can be used for a user to answer phone calls, and when the receiver and the cellphone body are separated, the receiver can be employed as a bluetooth headset. The cellphone with a detachable receiver of this invention is convenient to be carried about, simple in use, light and skillful in structure and easy to be stored.

9 Claims, 5 Drawing Sheets

CELLPHONE WITH A DETACHABLE RECEIVER

BACKGROUND OF THE INVENTION

1. Field of the Invention

This invention relates to a cellphone, particularly to one provided with a detachable receiver, convenient to be carried about, easy in use, light and skillful and easy to be stored.

2. Description of the Prior Art

In reality, cellphones have become indispensable necessities in daily life. Most conventional cellphones are disposed with no hands free or wireless reception equipment so a user has to use a cellphone with a hand-hold mode and hence, in many cases, the conventional cellphones are impossible to be used, for instance, when a user drives a car or takes exercise, thus resulting in much inconvenience to life. To solve the problem that the conventional cellphones have to be used by holding with a hand, external wired headsets or wireless bluetooth headsets are produced to enable a user to employ a cellphone when driving a car or taking exercise.

However, foresaid conventional cellphones disposed with the external wired headsets and the wireless bluetooth headsets have the following shortcomings: 1. The conventional cellphone has no superfluous space for depositing the external wired headset and the wireless bluetooth headset; therefore, the external wired headset and the wireless Bluetooth headset are apt to be lost or hard to be found; 2. When the external wired headset is connected with the conventional cellphone, the connecting wire between the conventional cellphone and the external wired headset is likely to get entangled; and 3. If the wireless bluetooth headset takes the place of the external wired headset, the answering device of the cellphone itself will leave unused in a using process of the cellphone, thus wasting resources. Further, since there is no proper method for storage of the wireless bluetooth headset so a user often needs to have the wireless bluetooth headset hung on ears, thus likely to cause discomfort to the ears in case of hanging it for a long time.

In view of the defects of the conventional cellphone, the external wired headset and the wireless bluetooth headset, the inventor of this invention adheres to the spirit of striving for perfection to research thoroughly for improving foresaid defects, and this is the objective of advising this invention.

SUMMARY OF THE INVENTION

The objective of this invention is to offer a cellphone with a detachable receiver, which is convenient to be carried, simple in use, light and skillful in structure, and easy to be stored and not easy to be lost. The cellphone with a detachable receiver in the present invention includes a cellphone body having its upper end provided with a recessed groove and its outer side transversely bored with a through hole communicating with the recessed groove. A receiver provided therein with a rechargeable battery and a bluetooth device is vertically and correspondingly inserted in the recessed groove to be exactly positioned at the location of the through hole of the cellphone body and electrically connected with the cellphone body.

The cellphone with a detachable receiver of this invention enables a user to have the receiver inserted in the recessed groove of the cellphone body and thus, the receiver can be used for the user to answer phone calls via the through hole. Further, the receiver is installed with the rechargeable battery; therefore, when the receiver is positioned in the recessed groove, the cellphone body is able to charge the rechargeable battery in the receiver and when the receiver is detached from the cellphone body, the receiver, which is provided therein with the bluetooth device, can be used as a bluetooth headset. Thus, a user can wear the receiver on the ear when driving a car or taking exercise and after using, the receiver can be inserted in the recessed groove, letting the receiver and the cellphone combined together. Therefore, by mutually combinable relation of the receiver and the recessed groove of the cellphone body, the cellphone with a detachable receiver in the present invention can be disposed integrally and separately, convenient to be carried, simple in use, light and skillful in structure, easy to be stored and not easy to be lost.

BRIEF DESCRIPTION OF INVENTION

This invention will be better understood by referring to the accompanying drawings, wherein.

DETAILED DESCRIPTION OF THE PREFERRED EMBODIMENT

Figure 1:
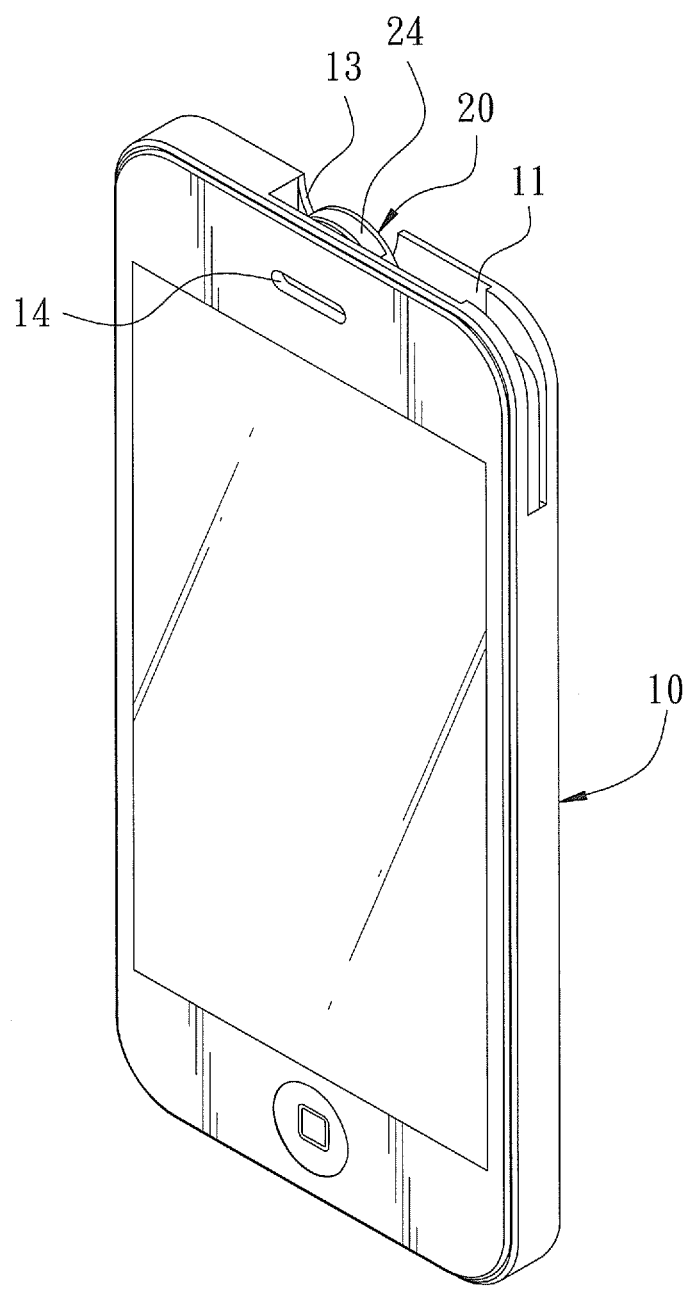
FIG. 1 is a perspective view of a first preferred embodiment of a cellphone with a detachable receiver in the present invention.
Figure 2:
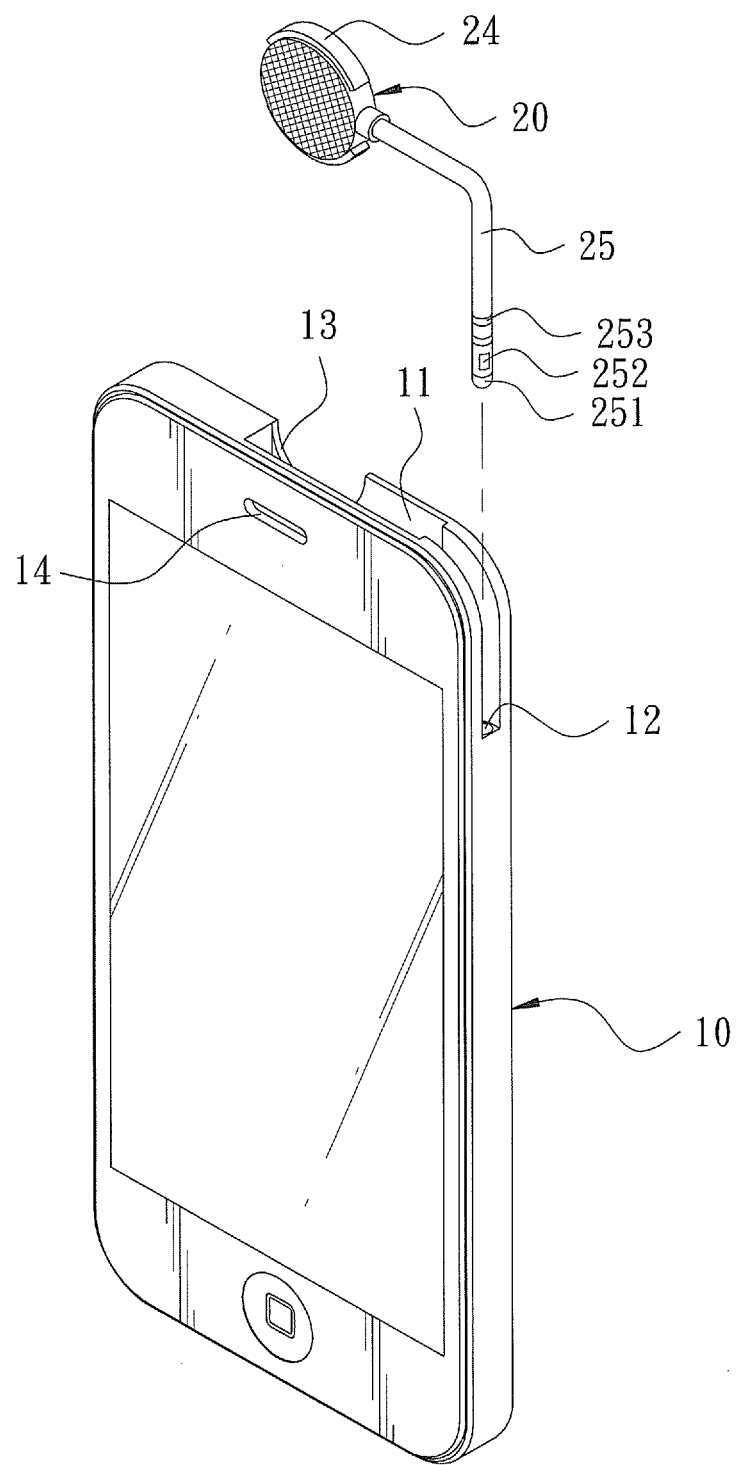
FIG. 2 is an exploded perspective view of the first preferred embodiment of the cellphone with a detachable receiver in the present invention.
Figure 3:
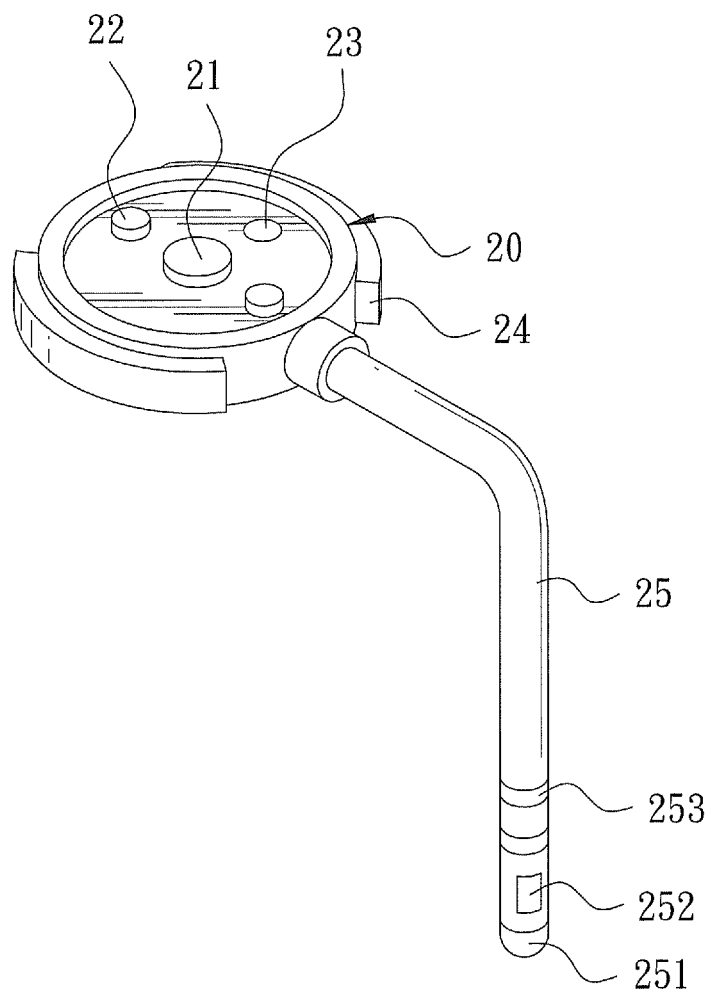
FIG. 3 is a perspective view of the detachable receiver in the present invention.

A first preferred embodiment of a cellphone with a detachable receiver in the present invention, as shown in FIGS. 1-3, includes a cellphone body 10 and a receiver 20.

The cellphone body 10 has a topside formed with a recessed groove 11 extending to one circumferential edge of the cellphone body 10 and is bored with an insert hole 12 at a predetermined location of the recessed groove 11. Further, the cellphone body 10 has an outer side formed with an opening 13 located at one side of the recessed groove 11 and another outer side transversely bored with a through hole 14 communicating with the recessed groove 11.

The receiver 20 is approximately cylinder-shaped in external appearance, having an interior provided with a rechargeable battery (not shown) and a bluetooth device (not shown) and its topside provided with an answering key 21, a volume regulating key 22 and a power indicating lamp 23. The answering key 21 is set in the center of the topside of the receiver 20, while the volume regulating key 22 is positioned near two sides of the answering key 21, and the power indicating lamp 23 is installed at one side of the answering key 21. The receiver 20 further has two circumferential sides respectively disposed with a retractable fasteners 24 and an outer circumferential wall transversely and pivotally assembled with an L-shaped handle 25 with one end able to be pivotally rotated relative to the receiver 20, and another end mounted with a touch piece 251 for a user to use as a stylus. The handle 25 further has its outer circumferential wall provided with an acoustic reception device 252 and a charging portion 253 at locations adjacent to the touch piece 251, with the charging portion 253 positioned above the acoustic reception device 252.

Referring to FIGS. 1 and 2, the receiver 20 is pivotally connected with the L-shaped handle 25 so the whole of the receiver 20 is formed into an L shape. In addition, the recessed groove 11 is provided to correspond with the integrated external form of the receiver 20; therefore, the handle 25 of the receiver 20 can be correspondingly inserted in the insert hole 12 of the cellphone body 10 to enable the receiver 20 to be placed in the recessed groove 11 and positioned at the location of the through hole 14. Thus, when the handle 25 is inserted in the insert hole 12, the receiver 20 and the cellphone body 10 will be electrically connected and the cellphone body 10 can charge the rechargeable battery (not shown) in the interior of the receiver 20 through the charging portion 253 of the receiver 20 and additionally, the receiver 20 can make use of the through hole 14 of the cellphone body 10 to enable the cellphone body 10 to answer phone calls. Moreover, to detach the receiver 20 from the cellphone body 10, simply remove the receiver 20 out of the recessed groove 11 through the opening 13 and have the receiver 20 stably fixed in a user's ear by means of the fasteners 24 of the receiver 20. At this time, the receiver 20 and the cellphone body 10 are in a state of wireless signal transmission, and a user can make use of the pivotal connecting relation of the handle 25 and the receiver 20 to control the handle 25 to a proper position of acoustic reception to let the acoustic reception device 252 of the handle 25 attain accurate reception effects.

In addition, when the receiver 20 and the cellphone body 10 are combined together, since the receiver 20 has answering function and the handle is provided with the acoustic reception device 252, therefore, the receiver 20 can be used for receiving phone calls and answering phone calls of the cellphone body 10.

Figure 4:
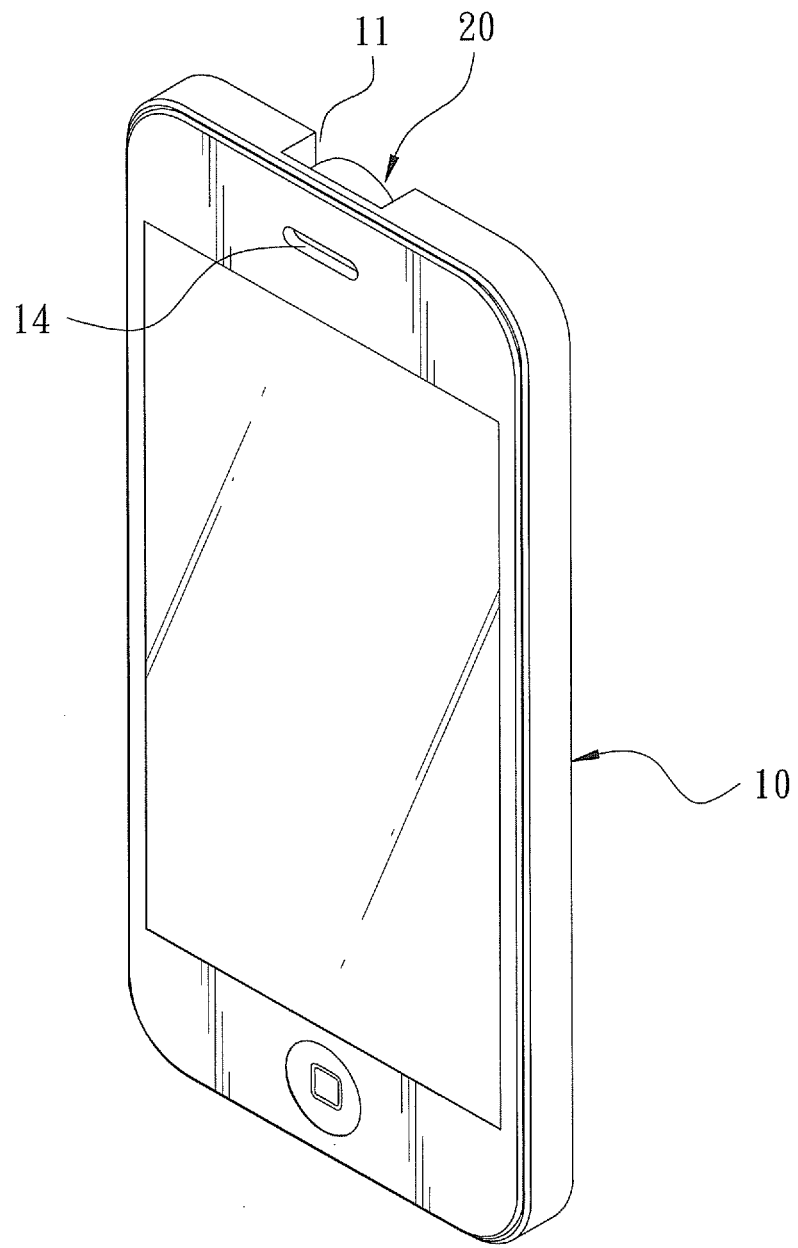
FIG. 4 is a perspective view of a second preferred embodiment of a cellphone with a detachable receiver in the present invention.
Figure 5:
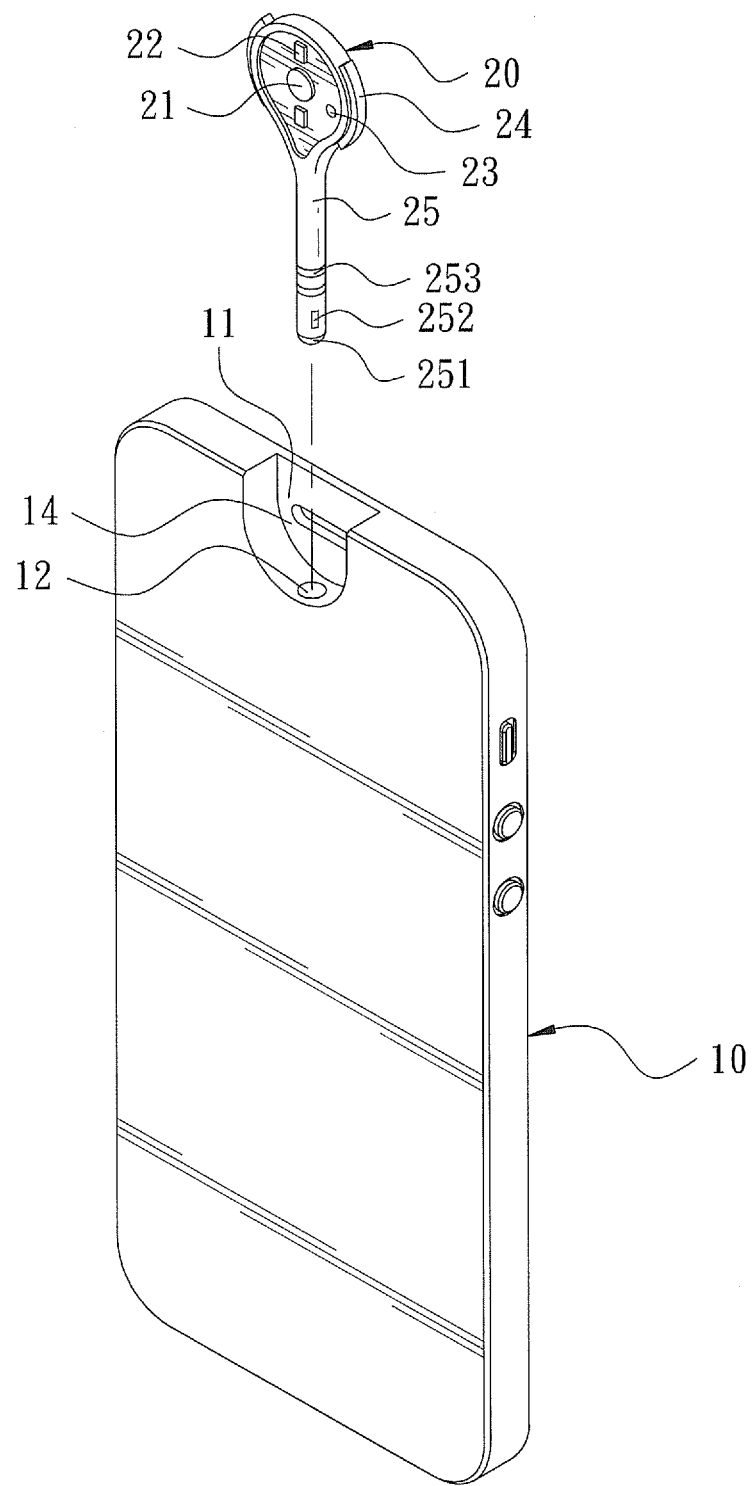
FIG. 5 is an exploded perspective view of second preferred embodiment of the cellphone with a detachable receiver in the present invention.

A second preferred embodiment of a cellphone with a detachable receiver in the present invention, as shown in FIGS. 4 and 5, is to have an outer surface of a receiver 20 provided with an answering key 21, a volume regulating key 22 and a power indicating lamp 23, which are the same in disposition mode as those of the first preferred embodiment, but a handle 25 of the receiver 20 in the second preferred embodiment is upright shaped so the receiver 20 is disposed in an upright type, and the handle 25 and the receiver 20 are integrally formed, not pivotally connected. The handle 25 has one end provided with a touch piece 251, an acoustic reception device 252 and a charging portion 253, and an interior shape of a recessed groove 11 of the cellphone body 10 is formed correspondingly with the external form of the receiver 20 and the central portion of the recessed groove 11 is vertically bored with an insert hole 12. Thus, after the handle 25 of the receiver 20 is vertically inserted in the insert hole 12, the receiver 20 can be used for receiving phone calls and answering phone calls of the cellphone body 10, and the cellphone body 10 can make use of the charging portion 253 of the handle 25 to charge the rechargeable battery (not shown) in the receiver 20. When the receiver 20 and the cellphone body 10 are separated, as described in the first preferred embodiment, the receiver 20 can be stably stuck on a user's ear by means of fasteners 24 of the receiver 20. At this time, the bluetooth device (not shown), which is provided in the receiver 20, and the cellphone body 10 are in a state of wireless signal transmission so that the receiver 20 can be used as a bluetooth headset. Thus, similar to the first preferred embodiment, by mutual combination of the recessed groove 11 and the receiver 20, the cellphone with a detachable receiver of the second embodiment in this invention is convenient to be carried about, simple in use, easy to be stored and not easy to be lost.

A first special feature of the first and the second embodiment in this invention is that the receiver 20 has its outer side provided with the answering key 21, the volume regulating key 22 and the power indicating lamp 23. When the receiver 20 is fitted and hung on a user's ear, the answering key 21 can be used to answer the incoming phone call of the cellphone body 10, and volume regulating key 22 can be employed to control the volume of sound. In addition, the power indicating lamp 23 can give out light of different colors for indicating the quality of electricity of the rechargeable battery (not shown) in the receiver 20 so a user is able to know the quantity of electricity of the rechargeable battery (not shown) in the receiver 20 via the power indicating lamp 23 and thus, the user can have the handle 25 of the receiver 20 inserted in the cellphone body 10 for charging the rechargeable battery (not shown) at an accurate opportune moment.

A second special feature of the first and the second embodiment in this invention is the receiver 20 is thereon provided with a contractible fasteners 24; therefore, when the receiver 20 and the cellphone body 10 are combined together, the fasteners 24 can be stored at two sides of the receiver 20, as shown in FIG. 1, to enable the receiver 20 to be smoothly set in the recessed groove 11 and when the receiver 20 is detached from the cellphone body 10, the fasteners 24 can be pressed to protrude out of two sides of the receiver 20, as shown in FIG. 2, to enable the receiver 20 to be stably stuck and hung in a user's ear.

While the preferred embodiments of the invention have been described above, it will be recognized and understood that various modifications may be made therein and the appended claims are intended to cover all such modifications that may fall within the spirit and scope of the invention.

What is claimed is:

1. A cellphone with a detachable receiver comprising:
    a cellphone body, said cellphone body having an upper end provided with a recessed groove, said cellphone body having an outer side transversely bored with a through hole, said through hole communicating with said recessed groove; and
    a receiver, said receiver disposed therein with a rechargeable battery and a bluetooth device, said receiver able to be vertically and correspondingly inserted in said recessed groove, letting said receiver exactly positioned at the location of said through hole, said receiver and said cellphone body combined together and electrically connected;
    In use, said receiver inserted in said recessed groove, said receiver able to be used for a user to receive phone calls via said through hole of said cellphone body, said cellphone body and said receiver becoming a state of wireless signal transmission through said bluetooth device in said receiver when said receiver and said cellphone body are separated.

2. The cellphone with a detachable receiver as claimed in claim 1, wherein said recessed groove of said cellphone body is bored with an insert hole, and said receiver is provided with a handle to be correspondingly inserted in said insert hole to make said cellphone body and said receiver electrically connected.

3. The cellphone with a detachable receiver as claimed in claim 2, wherein said handle has one end connected with said receiver and another end provided with a touch piece at a bottom, a charging portion and an acoustic reception device disposed at locations above said touch piece, said acoustic reception device positioned between said charging portion and said touch piece.

4. The cellphone with a detachable receiver as claimed in claim 2, wherein said handle is pivotally combined with said receiver to enable said receiver to be pivotally rotated relative to said handle.

5. The cellphone with a detachable receiver as claimed in claim 1, wherein said receiver has two circumferential sides respectively disposed with a contractible fastener so that said receiver can be stably stuck in a user's ear.

6. The cellphone with a detachable receiver as claimed in claim 1, wherein said receiver is formed in an L shape.

7. The cellphone with a detachable receiver as claimed in claim 1, wherein said receiver formed in an upright shape.

8. The cellphone with a detachable receiver as claimed in claim 1, wherein said receiver is provided with an answering key in a center of a topside, and a volume regulating key and a power indicating lamp, which are disposed near the circumferential sides of said answering key.

9. The cellphone with a detachable receiver as claimed in claim 2, wherein said cellphone body charges said rechargeable battery of said receiver through said charging portion when said handle of said receiver is inserted in said insert hole of said recessed groove.

\* \* \* \* \*